F. Van Doren,
Sheep Shears.
N° 69,513.  Patented Oct. 1, 1867.
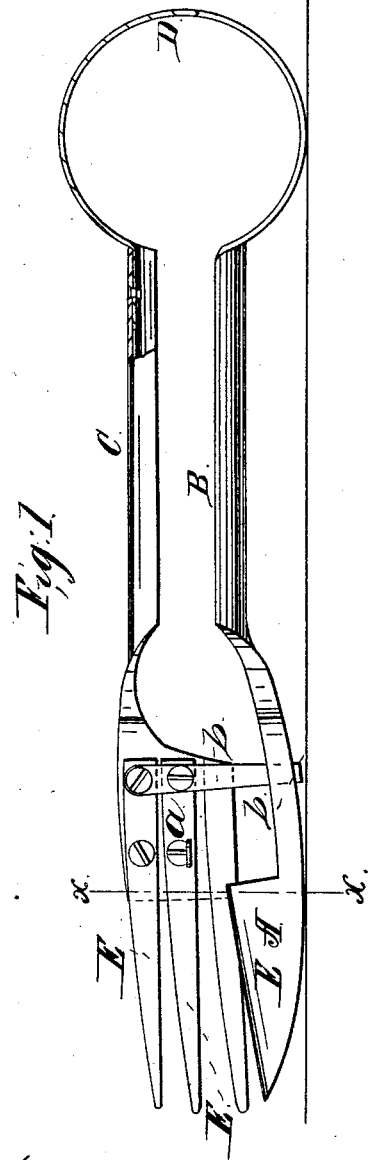
Witnesses.
Theo Tusche.
Wm. Trewen.
Inventor:
Francis Van Doren.
Per Munn & Co.
Attorneys

United States Patent Office.

FRANCIS VAN DOREN, OF ADRIAN, MICHIGAN.

Letters Patent No. 69,513, dated October 1, 1867.

IMPROVEMENT IN SHEEP-SHEARS.

The Schedule referred to in these Letters Patent and making part of the same.

TO ALL WHOM IT MAY CONCERN:

Be it known that I, FRANCIS VAN DOREN, of Adrian, Lenawee county, Michigan, have invented a new and useful Improvement in Sheep-Shears; and I do hereby declare that the following is a full, clear, and exact description thereof, which will enable others skilled in the art to make and use the same, reference being had to the accompanying drawings, forming part of this specification, in which—

Figure 1 represents a plan or top view of my improved sheep-shears.

Figure 2 is a detail cross-section of the same, the plane of section being indicated by the line $x\,x$, fig. 1.

Similar letters of reference indicate corresponding parts.

This invention relates to sheep-shears, in which two or more stationary cutters or fingers are arranged on one of the shanks, while on the other is a movable cutter of usual construction.

The object of this invention is to enable the operator to make three or more clips at once. The movable cutter moves between gauges or stops, whereby the spring that connects the shanks will be protected, and prevented from being strained.

A represents a cutter, which is secured to a shank, B, in the usual manner. The shank B is connected with the shank C by means of a spring, D, in the usual manner. To the shank C are secured, in any suitable manner, two or more cutters or fingers E, so that each of them will, in connection with the cutter A, make a complete clip, two or more clips being made during each move of the cutter A. To the shank C, or to the cutters E, are secured two gauges, $a$ and $b$, between which the cutter A can move, as is clearly shown in the drawing.

Having thus described my invention, I claim as new, and desire to secure by Letters Patent—

1. Having two or more stationary guards or cutters, E E, and one movable cutter, A, on sheep-shears, substantially as and for the purpose herein shown and described.

2. The movable cutter A, in combination with two or more stationary guards or cutters E E and gauges $a\,b$, all made and operating substantially as herein shown and described.

FRANCIS VAN DOREN.

Witnesses:
WILLARD STEARNS,
WM. L. GREENLEY.